United States Patent [19]

Canada et al.

[11] Patent Number: 5,768,556
[45] Date of Patent: Jun. 16, 1998

[54] METHOD AND APPARATUS FOR IDENTIFYING DEPENDENCIES WITHIN A REGISTER

[75] Inventors: Miles Gaylord Canada, Colchester, Vt.; Walter Esling, Colorado Springs, Colo.; Jay Gerald Heaslip, Williston, Vt.; Stephen William Mahin, Underhill; Pamela A. Wilcox, Burlington, both of Vt.; James Hesson, Austin, Tex.

[73] Assignee: International Business Machines Corporation, Armonk, N.Y.

[21] Appl. No.: 577,994

[22] Filed: Dec. 22, 1995

[51] Int. Cl.$^6$ .................. G06F 9/00; G06F 9/28
[52] U.S. Cl. ..................... 395/392; 395/800.23
[58] Field of Search ...................... 395/391, 392, 395/393, 394, 500, 800, 800.23, 800.42; 364/490, 491

[56] References Cited

U.S. PATENT DOCUMENTS

| | | | |
|---|---|---|---|
| 4,901,233 | 2/1990 | Liptay | 395/394 |
| 4,992,938 | 2/1991 | Cocke et al. | 395/393 |
| 5,134,561 | 7/1992 | Liptay | 395/491 |
| 5,201,057 | 4/1993 | Uht | 395/800.18 |
| 5,371,684 | 12/1994 | Iadonato et al. | 364/491 |
| 5,471,598 | 11/1995 | Quattromani et al. | 395/392 |
| 5,497,499 | 3/1996 | Garg et al. | 395/393 |
| 5,590,352 | 12/1996 | Zuraski, Jr. et al. | 395/392 |

*Primary Examiner*—William M. Treat
*Assistant Examiner*—Patrice L. Winder
*Attorney, Agent, or Firm*—Susan M. Murray

[57] ABSTRACT

An apparatus for use with a computer system for identifying dependencies within a register, which dependencies are established by a succession of instructions for the computer system. The register includes a plurality of cells which may be in a hierarchical arrangement of register storage sets. In its preferred embodiment, the apparatus comprises a storage means for storing a bit map, which bit map is configured to provide bit map identifications identifying designated register storage sets. The bit map represents the hierarchical arrangement. The apparatus further comprises a logic means for logically treating information, which logic means is coupled with the storage means and with the computer system. The logic means receives a first bit map identification from a first instruction (the first bit map identification identifies a first register storage set), and receives a second bit map identification from a second instruction (the second bit map identification identifies a second register storage set. The second instruction is subsequent in the succession to the first instruction. The first register storage set is a first storage locus for storing a target operand of the first instruction; the second register storage set is a second storage locus for storing a source operand for the second instruction. The logical treating effects the identifying of dependencies between the target operand and the source operand.

33 Claims, 1 Drawing Sheet

METHOD AND APPARATUS FOR IDENTIFYING DEPENDENCIES WITHIN A REGISTER

BACKGROUND OF THE INVENTION

The present invention is directed to a method and apparatus for identifying dependencies, within a register in a computer system. In its preferred embodiment, the present invention is directed to a method and apparatus for facilitating renaming registers to accommodate an Intel X86-type microprocessor's capability to access registers in subsets.

Prior art register addressing, where a register is addressable by a microprocessor in gross, is not adequate for more sophisticated register addressing schemes which allow access to registers in part. That is, in prior art computer systems a single register identification is used to indicate a given register, and the entire register (in gross) is read from and written to as a unit. However, when using a microprocessor having an architecture such as an Intel X86-type microprocessor, using only a register identification is inadequate.

One solution is to map the word length of information stored within a register and use that mapped word length to check for dependencies. One example of such dependencies is a requirement to read source information for a current instruction from an address which is the target address for an earlier, as yet unexecuted, instruction. There is a risk in such dependency situations that the current instruction may access the common address for its required source information before the earlier instruction updates (i.e., writes to) its target address at the same locus. Such dependencies must be identified in order that the current instruction may be delayed in its dispatch until the earlier instruction has been executed. The proposed solution to bit map the word length of stored information would provide that when the current instruction source address identification matches with the target address identification of the earlier instruction, but does not match in bit map, the current instruction is not dispatched. In such an approach, the current instruction would only be dispatched if it matches with the earlier instruction in both register address identification and in bit map, or if the current instruction did not match the earlier instruction in register identification (an indication that there is no dependency by the current instruction upon the earlier instruction). Such an arrangement would be unacceptably restrictive in dispatching instructions and would unnecessarily slow the system in which it was employed.

Another possible solution to the above described dependency dilemma is to rename the register on a field basis so that there would be a rename tag for each subset of the register. Such a solution would be less restrictive in dispatching instructions, but would be expensive in its hardware implementation.

There is a need for a method and apparatus for accessing subsets of registers which will not unnecessarily restrict dispatch of instructions, yet will not be hardware intensive or otherwise expensive in its implementation.

SUMMARY OF THE INVENTION

The present invention is a method and apparatus for register renaming to facilitate instruction dispatch control which allows instruction dispatch when a previous instruction updates or otherwise writes to either the same subset of a register as the subset from which current to-be-dispatched instruction is to receive its source operand, or a superset of that same subset. Thus, the invention is an apparatus for use with a computer system for identifying dependencies within a register, which dependencies are established by a succession of instructions for the computer system. The register includes a plurality of cells which may be in a hierarchical arrangement of register storage sets. In its preferred embodiment, the apparatus comprises a storage means for storing a bit map, which bit map is configured to provide bit map identifications identifying designated register storage sets. The bit map represents the hierarchical arrangement. The apparatus further comprises a logic means for logically treating information, which logic means is coupled with the storage means and with the computer system. The logic means receives a first bit map identification from a first instruction (the first bit map identification identifies a first register storage set), and receives a second bit map identification from a second instruction (the second bit map identification identifies a second register storage set. The second instruction is subsequent in the succession to the first instruction.

The first register storage set is a first storage locus for storing a target operand of the first instruction; the second register storage set is a second storage locus for storing a source operand for the second instruction. The logical treating effects the identifying of dependencies between the target operand and the source operand.

It is, therefore, an object of the present invention to provide an apparatus for identifying dependencies within a register which facilitates a processor architecture capable of accessing subsets of registers.

It is also an object of the present invention to provide an apparatus for identifying dependencies within a register which does not unnecessarily restrict dispatch of instructions yet is efficient in its implementation and operation.

It is yet a further object of the present invention to provide an apparatus for identifying dependencies within a register which facilitates dispatching a current instruction when a previous instruction updates or otherwise writes to either the same subset of a register as the subset in which the current instruction source operand is stored, or a superset of that register subset, using only one rename tag.

Further objects and features of the present invention will be apparent from the following specification and claims when considered in connection with the accompanying drawings illustrating the preferred embodiment of the invention.

DETAILED DESCRIPTION OF THE INVENTION

Figure 1:
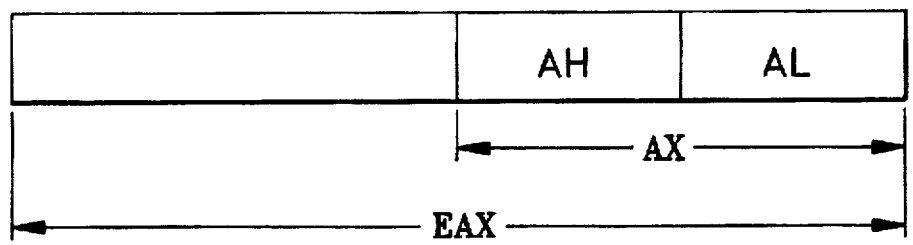
FIG. 1 is a schematic diagram of a representative register arranges with register subsets.

FIG. 1 is a schematic diagram of a representative register arranged with register subsets. In FIG. 1, a register segment AX may be, for example, a 16-bit portion of a 32-bit register EAX. Register segment AX may be appropriate for handling information as a 8086-type general register; register EAX may be appropriate for handling 486-type information requiring a 32-bit register. Register segment AX is further divided in FIG. 1 into high byte register segment AH and low byte register segment AL. In the example of FIG. 1, which is appropriate for use with a 486-type processor, information is right-justified (i.e., justified toward the least significant bit position) within register EAX.

Figure 2:
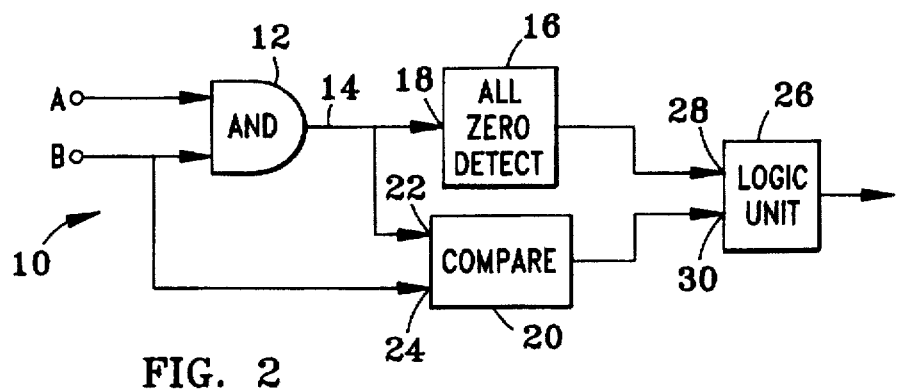
FIG. 2 is a schematic diagram of the preferred embodiment of the apparatus of the present invention.

FIG. 2 is a schematic diagram of the preferred embodiment of the apparatus of the present invention. In FIG. 2, an apparatus 10 is illustrated as receiving an A input and a B input to an AND gate 12. The B input is comprised of the source bit map of a current instruction (e.g., Instruction B); the A input is comprised of the target bit map of a non-executed instruction (e.g., Instruction A) which earlier occurs in a serially addressed sequence of instructions in a computing program being executed by a 486-type processor.

AND gate 12 generates an AND OUT signal on an output line 14. The AND OUT signal represents the logical result of ANDing Input A and Input B. The AND OUT signal is provided as an input signal to an ALL ZERO DETECT unit 16 at an input terminal 18. ALL ZERO DETECT unit 16 preferably performs a bit-wise NOR function on the AND OUT signal received at input terminal 18 to determine whether the AND OUT signal includes all zeroes.

The AND OUT signal is also provided as an input signal to a COMPARE unit 20 at an input terminal 22. Input B is also provided as an input signal to COMPARE unit 20 at an input terminal 24. COMPARE unit 20 compares the AND OUT signal received at input terminal 22 with Input B received at input terminal 24 to ascertain whether the two inputs match. ALL ZERO DETECT unit 16 generates an ALL ZERO output signal indicating whether the AND OUT signal is all zeroes (e.g., the ALL ZERO output signal may be "0" if the AND OUT signal is not all zeroes, and the ALL ZERO output signal may be "1" if the AND OUT signal is all zeroes). The ALL ZERO output signal is provided to a logic unit 26 at an input terminal 28.

COMPARE unit 20 generates a COMPARE output signal indicating whether the AND OUT signal and Input B match (e.g., the COMPARE output signal may be "0" if the AND OUT signal and Input B do not match, and the COMPARE output signal may be "1" if the AND OUT signal and Input B do match).

Given the exemplary values for the ALL ZERO output signal and the COMPARE output signal related above, logic unit 26 may implement a truth table as follows:

| DISPATCH | COMPARE | ALL ZEROES |
|---|---|---|
| NO Illegal Dependency | 0 | 0 |
| YES No Dependency | 0 | 1 |
| YES Legal Dependency | 1 | 0 |

An example of an appropriate bit map to effectively employ the present invention is:

| EAX | 1 | 1 | 1 | 0 |
|---|---|---|---|---|
| AX | 0 | 1 | 1 | 0 |
| AH | 0 | 1 | 0 | 1 |
| AL | 0 | 0 | 1 | 0 |

The case where both COMPARE and ALL ZEROES have the value "1" is irrelevant in this exemplary embodiment of the truth table inview of the exemplary bit map above. Given the exemplary bit map, there is no case where the value [Input A AND Input B] will be all zeroes and match with Input B because there is no register assigned a bit map designator of all zeroes.

The important feature of the bit map is that each register segment be identifiable as a subset or superset of its associated segments, as appropriate. Thus, in the exemplary bit map above, register segments AH and AL may readily be discerned as being subsets of register segment AX because of the most significant cell of those registers all being "0". Other bit map layouts can readily be defined by one skilled in the art to assure equally accurate identification of supersets and subsets within a register.

Whether a source register is a subset of a target register or is a superset of a target register is a key consideration and, therefore, a key determination made by the present invention. In realizing the importance of that determination it must be kept in mind that the evaluation of a source register vis-a-vis a target register is effected with respect to all previously scheduled (within the program) and unexecuted instructions. Thus, if Instruction B has a source register which is a subset of a previous instruction's (say, for example, Instruction $A_1$) target register, or is coextensive with Instruction $A_1$'s target register, then it is safe to dispatch Instruction B so long as execution of Instruction B is not effected until Instruction $A_1$ is executed. Stated another way, Instruction $A_1$ entirely affects the value of the contents of the source register of Instruction B. This is termed a legal dependency between Instruction $A_1$ and Instruction B.

If, however, the source register of Instruction B is a superset of Instruction $A_1$'s target register, then Instruction $A_1$ does not necessarily entirely affect the contents of Instruction B's source register. Other earlier scheduled unexecuted instructions (e.g., Instructions $A_2, A_3, \ldots, A_n$) may also affect the contents of Instruction B's source register. In such a circumstance, it is not safe to dispatch Instruction B. This is termed an illegal dependency between Instruction $A_1$ and Instruction B.

Continuing to explain the present invention by way of example, given the above exemplary bit map and truth table, one could experience the following three exemplary dependency situations between instructions.

EXAMPLE 1

Instruction A is followed by Instruction B in program order. Instruction A updates register AX, and Instruction B uses register AL as a source.

|  | Register | Bit Map | | |
|---|---|---|---|---|
| Instruction A Target: | AX | 0 | 1 | 1 |
| Instruction B Source: | AL | 0 | 0 | 1 |
| AND A and B: |  | 0 | 0 | 1 |
| COMPARE AND and B: | MATCH (COMPARE = 1) | | | |
| ZERO DETECT: | NOT ALL ZEROES (ALL ZEROES = 0) | | | |

This Example 1 illustrates a legal dependency. Instruction B may be dispatched, but may not be executed until Instruction A has been executed. In such manner, the update of register AX is assured to have been completed before the information stored in register AL is used as source information for Instruction B.

EXAMPLE 2

Instruction A is followed by Instruction B in program order. Instruction A updates register AL, and Instruction B uses register AX as a source.

|  | Register | Bit Map | | |
|---|---|---|---|---|
| Instruction A Target : | AL | 0 | 0 | 1 |
| Instruction B Source: | AX | 0 | 1 | 1 |
| AND A and B: |  | 0 | 0 | 1 |
| COMPARE AND and B:<br>ZERO DETECT: | NO MATCH (COMPARE = 0)<br>NOT ALL ZEROES (ALL ZEROES = 0) | | | |

This Example 2 illustrates an illegal dependency. Instruction B may not be dispatched. Other instructions may affect the value of information stored in the source register for Instruction B (i.e., register AX).

EXAMPLE 3

Instruction A is followed by Instruction B in program order. Instruction A updates register AL, and Instruction B uses register AH as a source.

|  | Register | Bit Map | | |
|---|---|---|---|---|
| Instruction A Target : | AL | 0 | 0 | 1 |
| Instruction B Source: | AH | 0 | 1 | 0 |
| AND A and B: |  | 0 | 0 | 0 |
| COMPARE AND and B:<br>ZERO DETECT: | NO MATCH (COMPARE = )<br>ALL ZEROES (ALL ZEROES = 1) | | | |

This Example 3 illustrates a circumstance in which there is no dependency between Instruction A and Instruction B. Instruction B may be dispatched.

Figure 3:
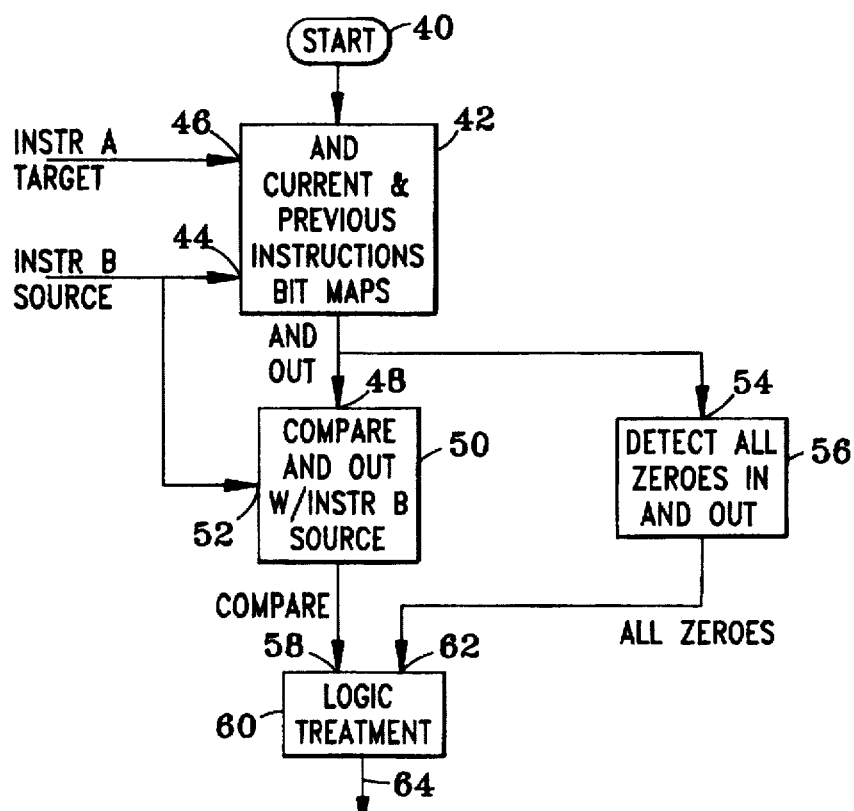
FIG. 3 is a schematic flow diagram of the preferred embodiment of the method of the present invention.

FIG. 3 is a schematic flow diagram of the preferred embodiment of the method of the present invention. In FIG. 3, the method begins at START Block 40 and proceeds to an ANDing step represented by an AND Block 42. A current instruction (Instruction B) source register bit map is received by AND Block 42 as an input 44. A previous unexecuted instruction (Instruction A) target register bit map is received by AND Block 42 as an input 46. AND Block 42 performs a logical ANDing of input 44 and input 46 and generates an AND OUT result. The AND OUT result indicates the ANDing of input 44 and input 46, and that AND OUT result is received as an input 48 to a COMPARE step represented by a COMPARE Block 50. The Instruction B source register bit map is also received as an input 52 to COMPARE Block 50. The AND OUT result is also received as an input 54 to an ALL ZERO DETECT Block 56.

COMPARE Block 50 represents a step by which a comparison is made between input 48 and input 52. A COMPARE result indicating the COMPARE step is generated and is received as an input 58 to a LOGIC Block 60.

ALL ZERO DETECT Block 56 represents a step by which it is determined whether input 54 is all zeroes. An ALL ZEROES result is generated indicating whether input 54 is all zeroes. The ALL ZEROES result is received as an input 62 to LOGIC Block 60.

LOGIC Block 60 represents a step by which a logical treatment of input 58 and input 62 is effected, as by asserting a logical relationship such as the truth table disclosed previously in connection with describing the preferred embodiment of the apparatus of the present invention. A result of such logical treatment is provided as an output 64 from LOGIC Block 60. The output 64 may be employed in deciding whether to dispatch Instruction B, or may be otherwise utilized as desired for a particular application.

Thus, the method involves the steps of comparing the register identifier (bit map) for the source operand of a current instruction (e.g., Instruction B) with the register identifier (bit map) of the target operand of each previous unexecuted instruction (e.g., Instruction A). The bit map comparison is accomplished by ANDing the Instruction B source register bit map with the Instruction A target register bit map. An AND OUT result indicating that ANDing is compared with the Instruction B source register bit map and a COMPARE result is generated indicating that COMPARE operation. Preferably substantially concurrently with the COMPAREing a bit-wise NOR is performed upon the AND OUT result to effect a check whether the AND OUT result is all zeroes. An ALL ZEROES result is generated to reflect that all zeroes check.

If there is a match between the AND OUT result and the Instruction B source register bit map, then a legal dependency has been found. Instruction B may be dispatched, but execution of Instruction B must await execution of Instruction A.

If there is no match found between the AND OUT result and the Instruction B source register bit map, and the AND OUT result is all zeroes, then there is no dependency between Instruction A and Instruction B. Instruction B may be dispatched.

If there is no match found between the AND OUT result and the Instruction B source register bit map, and the AND OUT result is not all zeroes, then there is an illegal dependency. Instruction B may not be dispatched.

Another example of an application useful for the present invention is in the area of flags-register maintenance. In prior art applications, instructions often only use or update a few bits of a flags-register. In such circumstances, renaming the entire flags-register is not as efficient an operation as would be possible if partial renaming were available. Partial matching or renaming, as provided by the present invention allows detection of situations where an instruction updates a subset of a flags-register and a following instruction uses a different subset (without overlap) of the flags-register. The present invention provides a method and apparatus by which one may allow both instructions to dispatch and execute. The present invention also provides a capability to detect a situation where an instruction updates a first set of the flags-register and then a following instruction uses the same first set or a subset of that first set. In such situations, both instructions are dispatched, but the later instruction is forced to wait until the earlier instruction executes. Still another flags-register situation in which the present invention finds utility is in a situation where an instruction updates a first set of the flags-register and a subsequent instruction uses a superset of those flags in the first set. That is, the later instruction uses some or all of the earlier instruction's flags, plus other flags. In such a situation, the later instruction cannot dispatch and must wait until the earlier instruction has retired.

In such a flags-register application, each instruction has a flags-register source bit map that establishes which bits an instruction will use in the flags-register. Further, each instruction has a flags-register target bit map that represents the bits which will be modified by the instruction in the flags-register. In each cycle a current instruction's source bit map is compared with a previous unexecuted instruction's target bit map. The ANDing, COMPAREing, and ALL ZERO DETECTing are effected as described above in connection with the 486-type register application; that description will not be repeated here in order to avoid unnecessary prolixity.

There is a difference between the flags-register application and the 486-type register application. In the 486-type register application, when an instruction updates register AH only (FIG. 1), as opposed to a situation where register AH would be updated as part of an updating of register AX or register EAX, the data is right justified. To be able to shift data to the AH field would require excessive hardware. As a prior art solution, a data shifter was placed in the register file to accomplish the shift upon the occasion of a read of the file or a write to the file. However, the data shifter did not solve the problem of shifting when data was provided from a rename register. The present invention solves the problem by providing that data is forwarded from register segment AH only when the dependence is a match in kind. That is, when an instruction seeks to access register segment AH as a part of register segment AX or register EAX, the data from register segment AX can only be forwarded from an instruction that updates register segment AH as a part of register segment AX or register EAX. If an instruction seeks to access register segment AH alone, that instruction can only depend from an earlier instruction that updated register segment AH alone. In order to detect that such a match-in-kind requirement is met, a bit is provided in the bit map register encoding which identifies register segment AH only. The match-in-kind bit map identifier is the least significant bit in the bit map provided in the earlier example: only register segment AH has a "1" in the least significant position. It should be noted that the presence of the match-in-kind does not alter the apparatus or method of the present invention, as previously described.

It is to be understood that, while the detailed drawings and specific examples given describe preferred embodiments of the invention, they are for the purpose of illustration only, that the structure and method of the invention are not limited to the precise details and conditions disclosed, and that various changes may be made therein without departing from the spirit of the invention which is defined by the following claims.

We claim:

1. An apparatus for use with a computer system for identifying dependencies within a register, said dependencies being established by a succession of a plurality of instructions for said computer system; said register including a plurality of cells in a hierarchical arrangement of a plurality of register storage sets; the apparatus comprising:

a storage means for storing a bit map; said bit map being configured to provide a plurality of bit map identifications identifying designated register storage sets of said plurality of register storage sets; said bit map representing said hierarchical arrangement;

a logic means for logically processing information; said logic means being coupled with said storage means and with said computer system; said logic means receiving a first bit map identification of said plurality of bit map identifications from a first instruction of said plurality of instructions, said first bit map identification identifying a first register storage set of said designated register storage sets; said logic means receiving a second bit map identification of said plurality of bit map identifications from a second instruction of said plurality of instructions, said second bit map identification identifying a second register storage set of said designated register storage sets; said second instruction being subsequent in said succession to said first instruction; said first register storage set being a first storage locus for storing a target operand of said first instruction; said second register storage set being a second storage locus for storing a source operand for said second instruction; said logical processing effecting said identifying dependencies between said target operand and said source operand; said logic means including a logic operation unit selected from the group consisting of an AND unit and an all-zero-detect unit.

2. An apparatus for use with a computer system for identifying dependencies within a register as recited in claim 1 wherein said logic operation unit is an AND unit for logically ANDing said bit map identification identifying said first register storage set and said bit map identification identifying said second register storage set to produce an AND result, said AND unit generating an AND output representing said AND result.

3. An apparatus for use with a computer system for identifying dependencies within a register as recited in claim 2 wherein said logic means further includes a comparing unit for comparing said AND output with said bit map identification identifying said second register storage set to produce a compare result; said comparing unit generating a compare output representing said compare result.

4. An apparatus for use with a computer system for identifying dependencies within a register as recited in claim 3 wherein said logic means further includes a all-zero-detect means coupled with said AND unit for detecting whether all bits of said AND output are zero; said all-zero-detect means generating an all-zero-detect signal indicating said detecting.

5. An apparatus for use with a computer system for identifying dependencies within a register as recited in claim 4 wherein said all-zero-detect means performs a bit-wise NOR function on said AND output.

6. An apparatus for use with a computer system for identifying dependencies within a register as recited in claim 5 wherein said logic means further includes a truth table implementing unit coupled with said comparing unit and with said all-zero-detect unit; said truth table implementing unit receiving said all-zero-detect signal and said compare output as inputs to a predetermined logical relationship to generate a logical output indicating said dependencies.

7. An apparatus for use with a computer system for identifying dependencies within a register as recited in claim 2 wherein said logic means further includes a all-zero-detect means coupled with said AND unit for detecting whether all bits of said AND output are zero; said all-zero-detect means generating an all-zero-detect signal indicating said detecting.

8. An apparatus for use with a computer system for identifying dependencies within a register as recited in claim 7 wherein said all-zero-detect means performs a bit-wise NOR function on said AND output.

9. An apparatus for use with a computer system for identifying dependencies within a register, said dependencies being established by a succession of a plurality of instructions for said computer system; said register including a plurality of cells in a plurality of register storage sets; the apparatus comprising:

a storage means for storing a bit map; said bit map being configured to provide a plurality of bit map identifications identifying designated register storage sets of said plurality of register storage sets;

a logic means for logically processing information; said logic means being coupled with said storage means and with said computer system; said logic means receiving a first bit map identification of said plurality of bit map identifications from a first instruction of said plurality of instructions, said first bit map identification identifying a first register storage set of said designated register storage sets; said logic means receiving a second bit map identification of said plurality of bit map identifications from a second instruction of said plurality of instructions, said second bit map identification identifying a second register storage set of said designated register storage sets; said second instruction being subsequent in said succession to said first instruction; said first register storage set being a first storage locus for storing a target operand of said first instruction; said second register storage set being a second storage locus for storing a source operand for said second instruction; said logical processing effecting said identifying dependencies between said target operand and said source operand; said logic means including a logic operation unit selected from the group consisting of an AND unit and an all-zero-detect unit.

10. An apparatus for use with a computer system for identifying dependencies within a register as recited in claim 9 wherein said logic operation unit is an AND unit for logically ANDing said bit map identification identifying said first register storage set and said bit map identification identifying said second register storage set to produce an AND result, said AND unit generating an AND output representing said AND result.

11. An apparatus for use with a computer system for identifying dependencies within a register as recited in claim 10 wherein said logic means further includes a comparing unit for comparing said AND output with said bit map identification identifying said second register storage set to produce a compare result; said comparing unit generating a compare output representing said compare result.

12. An apparatus for use with a computer system for identifying dependencies within a register as recited in claim 11 wherein said logic means further includes a all-zero-detect means coupled with said AND unit for detecting whether all bits of said AND output are zero; said all-zero-detect means generating an all-zero-detect signal indicating said detecting.

13. An apparatus for use with a computer system for identifying dependencies within a register as recited in claim 12 wherein said all-zero-detect means performs a bit-wise NOR function on said AND output.

14. An apparatus for use with a computer system for identifying dependencies within a register as recited in claim 13 wherein said logic means further includes a truth table implementing unit coupled with said comparing unit and with said all-zero-detect unit; said truth table implementing unit receiving said all-zero-detect signal and said compare output as inputs to a predetermined logical relationship to generate a logical output indicating said dependencies.

15. An apparatus for use with a computer system for identifying dependencies within a register as recited in claim 10 wherein said logic means further includes a all-zero-detect means coupled with said AND unit for detecting whether all bits of said AND output are zero; said all-zero-detect means generating an all-zero-detect signal indicating said detecting.

16. An apparatus for use with a computer system for identifying dependencies within a register as recited in claim 15 wherein said all-zero-detect means performs a bit-wise NOR function on said AND output.

17. A method for use with a computer system for identifying dependencies within a register, said dependencies being established by a succession of a plurality of instructions for said computer system; said register including a plurality of cells in a hierarchical arrangement of a plurality of register storage sets; the method comprising the steps of:

storing a bit map in a storage means; said bit map being configured to provide a plurality of bit map identifications identifying designated register storage sets of said plurality of register storage sets; said bit map representing said hierarchical arrangement;

logically processing information in a logic means; said logic means being coupled with said storage means and with said computer system; said logic means receiving a first bit map identification of said plurality of bit map identifications from a first instruction of said plurality of instructions, said first bit map identification identifying a first register storage set of said designated register storage sets; said logic means receiving a second bit map identification of said plurality of bit map identifications from a second instruction of said plurality of instructions, said second bit map identification identifying a second register storage set of said designated register storage sets; said second instruction being subsequent in said succession to said first instruction; said first register storage set being a first storage locus for storing a target operand of said first instruction; said second register storage set being a second storage locus for storing a source operand for said second instruction; said logical processing effecting said identifying dependencies between said target operand and said source operand; said logic means including a logic operation unit selected from the group consisting of an AND unit and an all-zero-detect unit.

18. A method for use with a computer system for identifying dependencies within a register as recited in claim 17 wherein said logic operation unit is an AND unit for logically ANDing said bit map identification identifying said first register storage set and said bit map identification identifying said second register storage set to produce an AND result, said AND unit generating an AND output representing said AND result.

19. A method for use with a computer system for identifying dependencies within a register as recited in claim 18 wherein said logic means further includes a comparing unit for comparing said AND output with said bit map identification identifying said second register storage set to produce a compare result; said comparing unit generating a compare output representing said compare result.

20. A method for use with a computer system for identifying dependencies within a register as recited in claim 18 wherein said logic means further includes a all-zero-detect means coupled with said AND unit for detecting whether all bits of said AND output are zero; said all-zero-detect means generating an all-zero-detect signal indicating said detecting.

21. A method for use with a computer system for identifying dependencies within a register as recited in claim 20 wherein said all-zero-detect means performs a bit-wise NOR function on said AND output.

22. A method for use with a computer system for identifying dependencies within a register as recited in claim 19 wherein said logic means further includes a all-zero-detect means coupled with said AND unit for detecting whether all bits of said AND output are zero; said all-zero-detect means generating an all-zero-detect signal indicating said detecting.

23. A method for use with a computer system for identifying dependencies within a register as recited in claim 22 wherein said all-zero-detect means performs a bit-wise NOR function on said AND output.

24. A method for use with a computer system for identifying dependencies within a register as recited in claim 23 wherein said logic means further includes a truth table implementing unit coupled with said comparing unit and with said all-zero-detect unit; said truth table implementing unit receiving said all-zero-detect signal and said compare output as inputs to a predetermined logical relationship to generate a logical output indicating said dependencies.

25. A method for use with a computer system for identifying dependencies within a register, said dependencies being established by a succession of a plurality of instructions for said computer system; said register including a plurality of cells in a plurality of register storage sets; the method comprising the steps of:

storing a bit map in a storage means; said bit map being configured to provide a plurality of bit map identifications identifying designated register storage sets of said plurality of register storage sets; logically processing information in a logic means; said logic means being coupled with said storage means and with said computer system; said logic means receiving a first bit map identification of said plurality of bit map identifications from a first instruction of said plurality of instructions, said first bit map identification identifying a first register storage set of said designated register storage sets; said logic means receiving a second bit map identification of said plurality of bit map identifications from a second instruction of said plurality of instructions, said second bit map identification identifying a second register storage set of said designated register storage sets; said second instruction being subsequent in said succession to said first instruction; said first register storage set being a first storage locus for storing a target operand of said first instruction; said second register storage set being a second storage locus for storing a source operand for said second instruction; said logical processing effecting said identifying dependencies between said target operand and said source operand; said logic means including a logic operation unit selected from the group consisting of an AND unit and an all-zero-detect unit.

26. A method for use with a computer system for identifying dependencies within a register as recited in claim 25 wherein said logic operation unit is an AND unit for logically ANDing said bit map identification identifying said first register storage set and said bit map identification identifying said second register storage set to produce an AND result, said AND unit generating an AND output representing said AND result.

27. A method for use with a computer system for identifying dependencies within a register as recited in claim 26 wherein said logic means further includes a comparing unit for comparing said AND output with said bit map identification identifying said second register storage set to produce a compare result; said comparing unit generating a compare output representing said compare result.

28. A method for use with a computer system for identifying dependencies within a register as recited in claim 27 wherein said logic means further includes a all-zero-detect means coupled with said AND unit for detecting whether all bits of said AND output are zero; said all-zero-detect means generating an all-zero-detect signal indicating said detecting.

29. A method for use with a computer system for identifying dependencies within a register as recited in claim 28 wherein said all-zero-detect means performs a bit-wise NOR function on said AND output.

30. A method for use with a computer system for identifying dependencies within a register as recited in claim 29 wherein said logic means further includes a truth table implementing unit coupled with said comparing unit and with said all-zero-detect unit; said truth table implementing unit receiving said all-zero-detect signal and said compare output as inputs to a predetermined logical relationship to generate a logical output indicating said dependencies.

31. A method for use with a computer system for identifying dependencies within a register as recited in claim 26 wherein said logic means further includes a all-zero-detect means coupled with said AND unit for detecting whether all bits of said AND output are zero; said all-zero-detect means generating an all-zero-detect signal indicating said detecting.

32. A method for use with a computer system for identifying dependencies within a register as recited in claim 31 wherein said all-zero-detect means performs a bit-wise NOR function on said AND output.

33. An apparatus for use with a computer system for identifying dependencies within a register, said dependencies being established by a succession of a plurality of instructions for said computer system; said register including a plurality of cells in a hierarchical arrangement of a plurality of register storage sets; the apparatus comprising:

a storage means for storing a bit map; said bit map being configured to provide a plurality of bit map identifications identifying designated register storage sets of said plurality of register storage sets; said bit map representing said hierarchical arrangement;

a logic means for logically processing information; said logic means being coupled with said storage means and with said computer system; said logic means receiving a first bit map identification of said plurality of bit map identifications from a first instruction of said plurality of instructions, said first bit map identification identifying a first register storage set of said designated register storage sets; said logic means receiving a second bit map identification of said plurality of bit map identifications from a second instruction of said plurality of instructions, said second bit map identification identifying a second register storage set of said designated register storage sets; said second instruction being subsequent in said succession to said first instruction; said first register storage set being a first storage locus for storing a target operand of said first instruction; said second register storage set being a second storage locus for storing a source operand for said second instruction; said logic means including an AND unit, an all-zero-detect unit, a compare unit and a truth table; the AND receiving as inputs said first bit map identification and said second bit map identification; said all-zero detect receiving as input the output of said AND unit; said comparing unit receiving as inputs the output of said AND unit and said second bit map identification; the truth table receiving as inputs the output of the all-zeroe-detect unit and said comparating unit; said truth table having an output capable of determining whether there is a dependency withing a register.

\* \* \* \* \*